United States Patent [19]

Abbruzzi et al.

[11] Patent Number: 4,761,018
[45] Date of Patent: Aug. 2, 1988

[54] VEHICLE WHEEL MOUNTING ASSEMBLY

[75] Inventors: Joseph A. Abbruzzi, Oakland County, Mich.; John D. Dougherty, Stark County; Vikram M. Marballi, Warren County, both of Ohio

[73] Assignee: The Timken Company, Canton, Ohio

[21] Appl. No.: 16,133

[22] Filed: Feb. 18, 1987

[51] Int. Cl.⁴ .............................................. B60B 35/00
[52] U.S. Cl. ..................................... 280/674; 280/96.3
[58] Field of Search ....................... 280/96.1, 96.3, 674

[56] References Cited

U.S. PATENT DOCUMENTS

| | | | |
|---|---|---|---|
| 2,037,982 | 4/1936 | Hughes | 280/96.1 |
| 3,583,511 | 6/1971 | Asberg | 180/70.1 |
| 3,884,331 | 5/1975 | Asberg | 280/96.1 |
| 4,010,986 | 3/1977 | Otto | 301/6 E |
| 4,150,553 | 4/1979 | Aucktor | 280/96.3 |
| 4,504,099 | 3/1985 | Miki et al. | 280/96.1 |
| 4,558,885 | 12/1985 | Asberg | 680/674 |

Primary Examiner—Kenneth R. Rice
Attorney, Agent, or Firm—Gravely, Lieder & Woodruff

[57] ABSTRACT

A wheel mounting assembly which unifies the suspension strut and trailing control arm in a single unitary member which provides a principal part of a wheel bearing assembly. The unitary member avoids a multiplicity of parts which is a known problem common in the automotive art, and it reduces costs and weight, and results in a simpler job of repair when necessary. The companion member of the mounting system is associated with the wheel to provide a unitary member with the wheel supporting flange and a hollow sleeve to receive a shaft or spline.

4 Claims, 2 Drawing Sheets

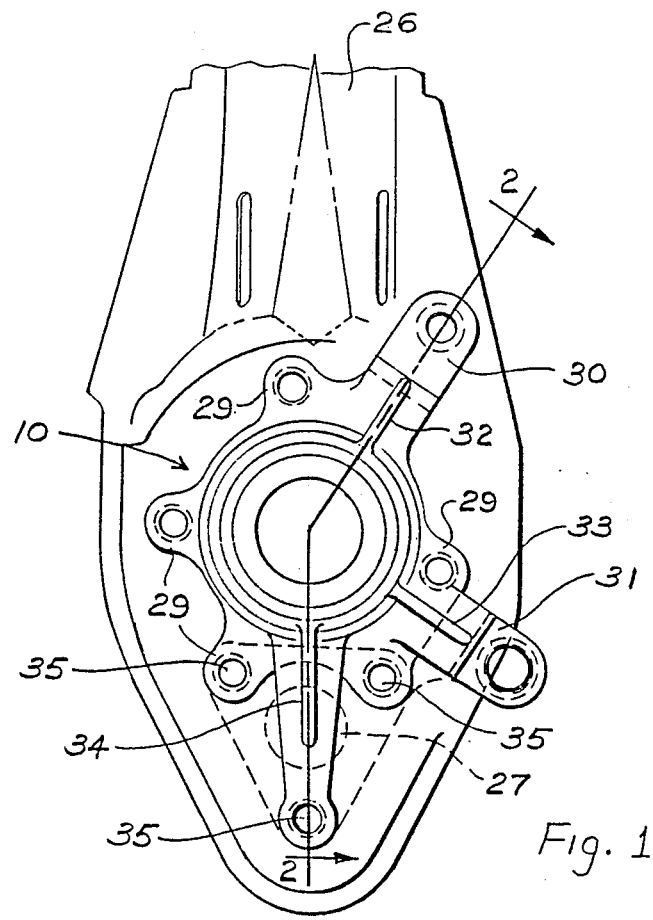
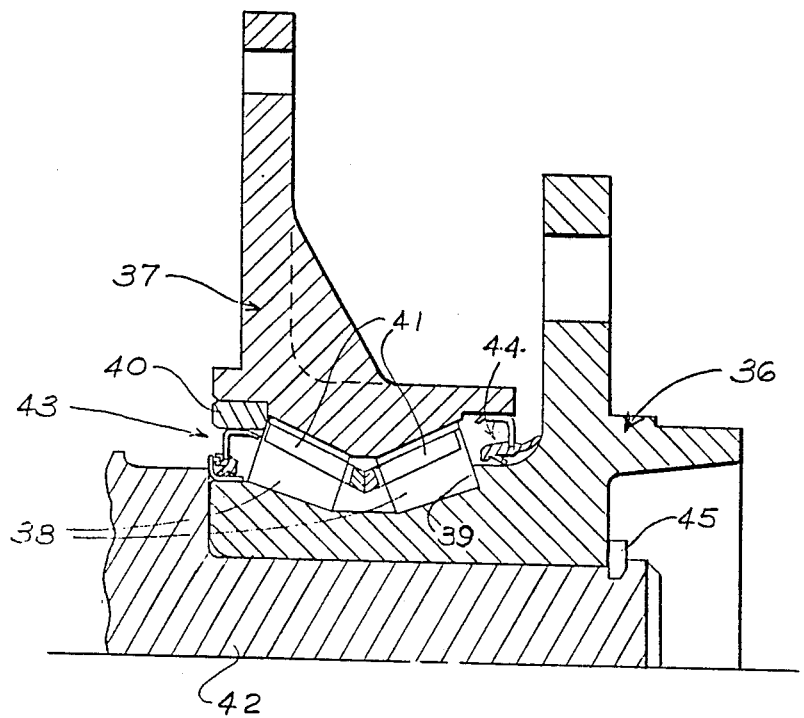

VEHICLE WHEEL MOUNTING ASSEMBLY

BACKGROUND OF THE INVENTION

1. Field of the Invention

This invention relates to vehicle wheel mounting assemblies generally, and includes improvements in mountings for front steerable wheels for front wheel drive vehicles.

2. Discussion of the Prior Art

The presently known prior art for vehicle wheels of driven type is represented by Asberg U.S. Pat. No. 3,583,511 of June 8, 1971. Coaley British Patent No. 1,298,552 of Dec. 6, 1972, and Otto U.S. Pat. No. 4,010,986 of Mar. 8, 1977. In these examples the bearing which carries the load is composed of many parts which require careful machining to obtain the necessary fit so the engine drive will allow the wheel to turn easily and provide the desired caster and camber alignment. Furthermore, the assemblies are complicated and intricate which adds cost and makes replacement of worn parts expensive in both parts and labor.

Prior to the appearance of the foregoing prior art, a patent of Hughes U.S. Pat. No. 2,037,982 issued Apr. 21, 1936 disclosed a bearing assembly adapted to an engine driven wheel as well as a trailing or follower wheel. In a similar disclosure British patent No. 1,254,553 issued Nov. 24, 1971 for a trailing or follower wheel bearing assembly. A more recent patent of Asberg U.S. Pat. No. 4,558,885 of Dec. 17, 1985 has disclosed a ball joint associated with a hub bearing.

The problems with the foregoing prior art assemblies are that the assemblies are composed of many individual parts that fit together in a complicated manner which makes the assembly and disassembly difficult, and when repair is needed the parts may be found frozen in place due to exposure to dirt, water and foreign matter picked up from road environment sources.

BRIEF DESCRIPTION OF THE INVENTION

An important object of the present invention, in response to the need for correcting the problems found in the prior art, resides in providing a vehicle wheel mounting assembly that has reduced weight along with a reduction in the number and complexity of shapes of components so that manufacturing costs and assembly time can be significantly reduced.

It is another important object of the present invention to provide in a vehicle wheel mounting an antifriction roller bearing cup which incorporates a surface for attachment to a steering knuckle, and flange means which can carry a brake caliper as well as a closure for a ball joint socket, thereby achieving weight reduction by the reduction in the number of components.

A further object of the present invention is to provide a single piece cup having brake caliper mounting flanges and a ball joint closure, and a single piece cone to which a vehicle wheel can be connected.

The present invention is embodied in a preferred assembly associated with a vehicle suspension and wheel position control ball joint, the assembly comprising an outer member, an inner member, and bearing means disposed between the outer and inner members, and in that assembly the outer member includes a bearing housing with bearing races and attachment means for the vehicle suspension, a brake caliper, and a ball joint seat, and the inner member includes a stub axle having races for the bearing means and a flange to which the vehicle wheel and brake rotor can be attached.

The wheel mounting system above described provides an important improvement in this art as it unifies the suspension strut and trailing control arm in a single unitary member which provides a principal part of a wheel bearing assembly. Being a unitary member, it avoids a multiplicity of parts which is common in the automotive art, and thereby reduces costs and weight, and results in a simpler job of repair when the time comes. The companion member of the mounting system is associated with the wheel to provide a unitary member with a wheel supporting flange and a hollow sleeve which receives a shaft or spindle. The companion member and the principal part provide spaced raceways for suitable antifriction bearings, the principal part carries a support for brake actuating means and the companion member supports a brake drum or rotor. Thus, the entire system has significantly fewer parts to create problems, it is substantially lighter in weight and the fewer parts can be stronger due to the integral nature of the same.

The present mounting system is adapted to accommodate either a driven installation in which a splined stub shaft part of a universal joint can be engaged with the wheel sleeve, or a trailing non-driven installation in which a fixed spindle is carried by the vehicle frame.

The preferred embodiment is unique in that the outer and inner members are each formed in one-piece which avoids the problem in the prior art of many parts which increases weight and difficulty in assembly as tolerances are not as great as would be the case in assembly of many parts.

BRIEF DESCRIPTION OF THE DRAWINGS

The present invention is illustrated in the accompanying drawings, wherein:

FIG. 1 is an elevational view of the wheel mounting portion of the assembly showing the suspension attached to the outer member which constitutes a housing for the bearing;

FIG. 3 is a sectional view similar to FIG. 2, but showing a modified structure surrounding the bearing.

DESCRIPTION OF THE EMBODIMENTS

Figure 2:
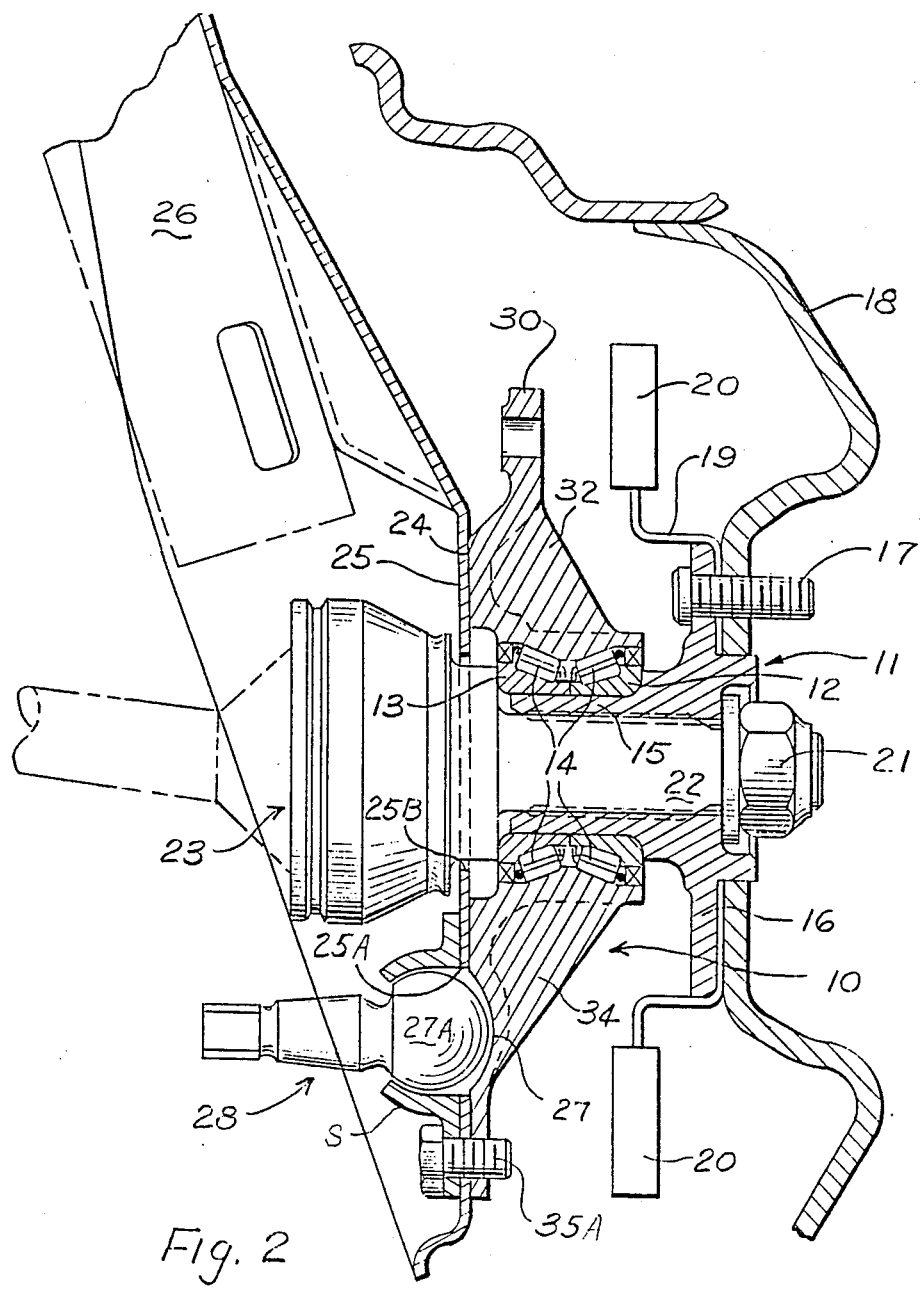
FIG. 2 is a vertical sectional view as seen along line 2—2 in FIG. 1, in which the wheel and the inner member of the assembly are included.

According to FIG. 2 in the drawings, the subject invention is seen to comprise a first or outer member 10 and a second or inner member 11 which are positioned in assembly with antifriction bearings between the bearing races which are formed on the respective outer and inner members. In the view of FIG. 2 the antifriction bearings are in the form of tapered rollers which are operatively positioned between the outer and inner members by means of suitable cone assemblies that are pressed onto the inner member 11. The tapered rollers are maintained in an operative relationship by single wing polymer cages 14 (see FIG. 2). Cages of this type offer the advantage of simplifying the assembly procedure. Cages 14 and rolling elements can, as a unit, be pressed onto their respective inner rings 12 and 13.

The inner member 11 is a unitary body having an internal sleeve 15 and a radially projecting flange 16 presented for the attachment by suitable wheel lugs 17 of a wheel 18, together with a suitable bracket 19 carrying the usual brake rotor 20. The unitary inner member 11 is secured in a generally conventional manner by a retaining nut 21 on the stub axle 22 of an adjacent universal joint 23 associated with the drive input from a conventional source not shown.

The outer unitary member 10 is formed with cooperating races for the tapered roller bearings, and additionally is formed with a flat face surface 24 adapted to be connected to a flat flange 25 formed on a stamped metal strut 26. In the view of FIG. 2 the face 24 provides a socket or recess 27 for the purpose of locating a ball head 27A of a ball joint 28 (shown in outline) carried on a wheel position control arm (not shown). The ball joint fits in a suitable opening 25A, and a further opening 25B in the strut flange 25 is formed to permit the universal joint stub axle to pass through and be engaged by a suitable spline connection with the sleeve 15 on the inner member 11 in order to obtain the necessary drive connection.

Turning now to FIG. 1 there is shown the portions of the above described structure with the inner member 11 removed so as to show further details in the structure of the outer member 10. In this view the outer member 10 is formed with bolt ears 29 spaced around the member and presented to the flat face 25 on the strut 26. The ears 29 are shown without the securing bolts for clarity of disclosure. Furthermore, the outer member 10 is formed with projecting lugs 30 and 31 arranged at approximately 90° to each other and of sufficient length with respect to the brake rotor 20 so as to be useful for supporting a brake caliper assembly not shown. The lug 30 is strengthened by a rib 32, the lug 31 is strengthened by a rib 33, and the portion of the outer body adjacent the recess 27 for the ball joint 28 is strengthened by a further rib 34. It can be seen in FIG. 1 that the ball joint recess 27 is located in the member adjacent ball joint securing apertures 35 for the reception of ball joint mounting bolts, one being shown at 35A, for the socket means S.

Attention is now directed to FIG. 3 where there is shown in sectional view a modified structure in which the inner cone member 36 and the outer cup member 37 are operatively associated with tapered rolling elements 38 which are secured in position between a rib or shoulder 39 on cone member 36 and a rib ring 40 is positively held in place (e.g. by welding) in the outer cup member 37 opposite the shoulder 39 of the cone member 36. The rib ring 40 does not need any suspension components to back it up. The tapered rolling elements 38 are separated by finger type cages 41 of the type previously referred to. The assembly is provided with separate seals 43 and 44 of a hydrodynamic labyrinth form. In other respects the modified assembly shown in FIG. 3 is adapted to have its outer member 37 connected to a suspension means, such as the strut 26 of FIG. 2, in the same manner that has been described above, while the inner member 36 is adapted to be connected to the shaft 42 of a universal joint in the drive for a wheel (not shown) attached to the member 36. This latter construction is similar to what has been shown in FIG. 2.

In FIG. 3 the shaft 42 is held in place axially by a snap ring 45 as distinguished from a nut as in FIG. 2. In this assembly the bearing setting is not dependent on clamp loads resulting from retaining nuts. The bearing would be totally preset in the factory. Thus, clamp-up of the bearing components in the application is eliminated.

The foregoing description has disclosed a preferred embodiment of the improved assembly by which the invention can be reduced to practice, either in the form shown in the drawings or by equivalent assemblies that fall within the scope of the disclosure.

What is claimed is:

1. In a mounting assembly for a vehicle wheel in which the mounting assembly includes a unitary inner member for connection to an axle member and presenting a flange for supporting the wheel, a unitary outer member presenting a surface to which a strut is secured for supporting the mounting assembly on the vehicle and a wheel control arm, and anti-friction bearings between the inner and outer members, the improvement in the mounting assembly wherein:
    (a) said outer unitary member is formed with a plane flat surface presented to the axle member and the strut, said surfce having a recess therein opening outwardly adjacent the location of the axle member;
    (b) a ball joint presented to said recess and extending outwardly from said surface; and
    (c) socket means carried by said surface in position to retain said ball joint in said recess.

2. The improvement in the mounting assembly of claim 1 wherein said inner unitary member is formed with an axially elongated sleeve for the reception of the axle member.

3. The improvement in the mounting assembly of claim 1 wherein the strut for supporting the mounting assembly is formed with a flange presented to said plane flat surface, said flange having an opening at said recess; and common means interconnected said socket means, said flange of said strut and said outer body in assembly.

4. The improvement in the mounting assembly of claim 3 wherein said outer member is formed with rib means for adding strength to said outer member adjacent said recess.

* * * * *

UNITED STATES PATENT AND TRADEMARK OFFICE
CERTIFICATE OF CORRECTION

PATENT NO. : 4,761,018

DATED : Aug. 2, 1988

INVENTOR(S) : Joseph A. Abbruzzi, John D. Dougherty, Vikram M. Marballi

It is certified that error appears in the above-identified patent and that said Letters Patent is hereby corrected as shown below:

ON THE TITLE PAGE:

Item [75] Inventors: should be corrected to remove the names of John D. Dougherty, and Vikram M. Marballi.

Signed and Sealed this

Thirty-first Day of January, 1989

*Attest:*

DONALD J. QUIGG

*Attesting Officer*   *Commissioner of Patents and Trademarks*